US012389175B2

(12) United States Patent
Haubrich et al.

(10) Patent No.: US 12,389,175 B2
(45) **Date of Patent: *Aug. 12, 2025**

(54) RADIO FREQUENCY MEMS DEVICES FOR IMPROVED WIRELESS PERFORMANCE FOR HEARING ASSISTANCE DEVICES

(71) Applicant: Starkey Laboratories, Inc., Eden Prairie, MN (US)

(72) Inventors: Gregory John Haubrich, Champlin, MN (US); Jeffrey Paul Solum, Greenwood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/936,485

(22) Filed: Sep. 29, 2022

(65) Prior Publication Data

US 2023/0016111 A1 Jan. 19, 2023

Related U.S. Application Data

(63) Continuation of application No. 16/557,510, filed on Aug. 30, 2019, now Pat. No. 11,490,212, which is a (Continued)

(51) Int. Cl.
*H04R 25/00* (2006.01)

(52) U.S. Cl.
CPC ..... *H04R 25/554* (2013.01); *H04R 2201/003* (2013.01); *H04R 2225/0216* (2019.05); *H04R 2225/023* (2013.01); *H04R 2225/025* (2013.01)

(58) Field of Classification Search
CPC ............ H04R 25/554; H04R 2201/003; H04R 2225/0216; H04R 2225/023; H04R 2225/025
See application file for complete search history.

(56) References Cited

U.S. PATENT DOCUMENTS 4,286,260 A 8/1981 Gershberg et al.
4,491,980 A 1/1985 Ichikawa (Continued)

FOREIGN PATENT DOCUMENTS

EP 1283657 A1 2/2003
WO WO-2006133158 A1 12/2006

OTHER PUBLICATIONS

"U.S. Appl. No. 12/569,567, Advisory Action mailed May 19, 2016", 5 pgs.

(Continued)

*Primary Examiner* — Suhan Ni
(74) *Attorney, Agent, or Firm* — Schwegman Lundberg & Woessner, P.A.

(57) ABSTRACT

Disclosed herein, among other things, are methods and apparatus for wireless electronics using a MEMS switch for a hearing assistance device. The present application relates to a hearing assistance device configured to be worn by a wearer. The hearing assistance device includes a housing for electronics of the hearing assistance device, including wireless electronics. The wireless electronics include a plurality of radio frequency (RF) MEMS switches, in various embodiments. A hearing assistance processor is adapted to process signals for the wearer of the hearing assistance device. In various embodiments, the hearing assistance device includes an antenna, and a switchable capacitor bank configured for tuning the antenna, the switchable capacitor bank including one or more of the plurality of RF MEMS switches. The plurality of RF MEMS switches include an electrostatically deformed RF MEMS membrane, in an embodiment. Different configurations and approaches are provided.

19 Claims, 5 Drawing Sheets

Related U.S. Application Data continuation of application No. 15/977,372, filed on May 11, 2018, now Pat. No. 10,405,110, which is a continuation of application No. 14/751,691, filed on Jun. 26, 2015, now Pat. No. 9,986,347, which is a continuation-in-part of application No. 12/569,567, filed on Sep. 29, 2009, now abandoned.

(56) References Cited

U.S. PATENT DOCUMENTS

| | | | | |
|---|---|---|---|---|
| 4,689,820 | A | 8/1987 | Kopke et al. | |
| 5,734,976 | A | 3/1998 | Bartschi et al. | |
| 5,751,820 | A | 5/1998 | Taenzer | |
| 5,880,921 | A | 3/1999 | Tham et al. | |
| 6,150,901 | A | 11/2000 | Auken | |
| 6,327,463 | B1 | 12/2001 | Welland | |
| 7,058,434 | B2 | 6/2006 | Wang et al. | |
| 7,084,811 | B1 | 8/2006 | Yap et al. | |
| 7,529,565 | B2 | 5/2009 | Hilpisch et al. | |
| 7,738,665 | B2 | 6/2010 | Dijkstra et al. | |
| 7,940,945 | B2 | 5/2011 | Callias et al. | |
| 8,816,921 | B2 | 8/2014 | Ayatollahi | |
| 9,986,347 | B2 | 5/2018 | Haubrich et al. | |
| 10,405,110 | B2 | 9/2019 | Haubrich et al. | |
| 11,490,212 | B2 * | 11/2022 | Haubrich | H04R 25/554 |
| 2002/0183013 | A1 | 12/2002 | Auckland et al. | |
| 2003/0078037 | A1 | 4/2003 | Auckland et al. | |
| 2004/0085159 | A1 | 5/2004 | Kubena et al. | |
| 2004/0116151 | A1 | 6/2004 | Bosch et al. | |
| 2005/0069164 | A1 | 3/2005 | Muthuswamy et al. | |
| 2005/0285692 | A1 | 12/2005 | Mattila et al. | |
| 2006/0274747 | A1 | 12/2006 | Duchscher et al. | |
| 2007/0001783 | A1 | 1/2007 | Lutz et al. | |
| 2007/0207761 | A1 | 9/2007 | LaBerge et al. | |
| 2008/0317260 | A1 | 12/2008 | Short | |
| 2009/0097683 | A1 | 4/2009 | Burns et al. | |
| 2009/0130988 | A1 | 5/2009 | Goldberg | |
| 2010/0015918 | A1 | 1/2010 | Liu et al. | |
| 2010/0172523 | A1 | 7/2010 | Burns et al. | |
| 2010/0216412 | A1 | 8/2010 | Rofougaran | |
| 2011/0075870 | A1 | 3/2011 | Solum | |
| 2015/0171823 | A1 | 6/2015 | Brawley | |
| 2015/0304783 | A1 | 10/2015 | Haubrich et al. | |
| 2018/0367922 | A1 | 12/2018 | Haubrich et al. | |
| 2020/0007996 | A1 | 1/2020 | Haubrich et al. | |

OTHER PUBLICATIONS

"U.S. Appl. No. 12/569,567, Advisory Action mailed Jul. 12, 2013", 5 pgs.
"U.S. Appl. No. 12/569,567, Advisory Action mailed Jul. 18, 2014", 3 pgs.
"U.S. Appl. No. 12/569,567, Final Office Action mailed Feb. 25, 2013", 8 pgs.
"U.S. Appl. No. 12/569,567, Final Office Action mailed Feb. 26, 2016", 17 pgs.
"U.S. Appl. No. 12/569,567, Final Office Action mailed Apr. 10, 2014", 12 pgs.
"U.S. Appl. No. 12/569,567, Non Final Office Action mailed Jan. 16, 2015", 9 pgs.
"U.S. Appl. No. 12/569,567, Non Final Office Action mailed May 10, 2012", 8 pgs.
"U.S. Appl. No. 12/569,567, Non Final Office Action mailed Aug. 26, 2015", 10 pgs.
"U.S. Appl. No. 12/569,567, Non Final Office Action mailed Oct. 3, 2013", 9 pgs.
"U.S. Appl. No. 12/569,567, Response filed Jan. 3, 2014 to Non Final Office Action mailed Oct. 3, 2013", 6 pgs.
"U.S. Appl. No. 12/569,567, Response filed Apr. 16, 2015 to Non Final Office Action mailed Jan. 16, 2015", 6 pgs.
"U.S. Appl. No. 12/569,567, Response filed Apr. 26, 2016 to Final Office Action mailed Apr. 26, 2016", 8 pgs.
"U.S. Appl. No. 12/569,567, Response filed Jun. 11, 2014 to Final Office Action mailed Apr. 10, 2014", 7 pgs.
"U.S. Appl. No. 12/569,567, Response filed Jun. 25, 2013 to Final Office Action mailed Feb. 25, 2013", 8 pgs.
"U.S. Appl. No. 12/569,567, Response filed Nov. 12, 2012 to Non Final Office Action mailed May 10, 2012", 8 pgs.
"U.S. Appl. No. 12/569,567, Response filed Nov. 25, 2015 to Non Final Office Action mailed Aug. 26, 2015", 8 pgs.
"U.S. Appl. No. 14/751,691, Advisory Action mailed Dec. 1, 2016", 5 pgs.
"U.S. Appl. No. 14/751,691, Advisory Action mailed Dec. 8, 2017", 4 pgs.
"U.S. Appl. No. 14/751,691, Corrected Notice of Allowance mailed Mar. 5, 2018", 2 pgs.
"U.S. Appl. No. 14/751,691, Final Office Action mailed Jul. 11, 2016", 17 pgs.
"U.S. Appl. No. 14/751,691, Final Office Action mailed Aug. 8, 2017", 19 pgs.
"U.S. Appl. No. 14/751,691, Non Final Office Action mailed Jan. 5, 2017", 17 pgs.
"U.S. Appl. No. 14/751,691, Non Final Office Action mailed Feb. 2, 2016", 13 pgs.
"U.S. Appl. No. 14/751,691, Notice of Allowance mailed Jan. 26, 2018", 8 pgs.
"U.S. Appl. No. 14/751,691, Response Filed Apr. 5, 2017 to Non Final Office Action mailed Jan. 5, 2017", 8 pgs.
"U.S. Appl. No. 14/751,691, Response filed Sep. 12, 2016 to Final Office Action mailed Jul. 11, 2016", 8 pgs.
"U.S. Appl. No. 14/751,691, Response Filed Oct. 10, 2017 to Final Office Action mailed Aug. 8, 2017", 8 pgs.
"U.S. Appl. No. 14/751,691, Response filed Dec. 12, 2016 to Advisory Action mailed Dec. 1, 2016", 8 pgs.
"U.S. Appl. No. 15/977,372, 312 Amendment filed May 29, 2019", 6 pgs.
"U.S. Appl. No. 15/977,372, Non Final Office Action mailed Feb. 26, 2019", 6 pgs.
"U.S. Appl. No. 15/977,372, Notice of Allowance mailed Apr. 26, 2019", 9 pgs.
"U.S. Appl. No. 15/977,372, Preliminary Amendment filed Sep. 6, 2018", 6 pgs.
"U.S. Appl. No. 15/977,372, PTO Response to Rule 312 Communication mailed Jul. 11, 2019", 2 pgs.
"U.S. Appl. No. 15/977,372, Resposne filed Apr. 2, 2019 to Non Final Office Action mailed Feb. 26, 2019", 5 pgs.
"U.S. Appl. No. 16/557,510, Advisory Action Mailed May 18, 2022", 2 Pgs.
"U.S. Appl. No. 16/557,510, Final Office Action mailed Mar. 9, 2022", 12 pgs.
"U.S. Appl. No. 16/557,510, Non Final Office Action mailed Aug. 27, 2021", 12 pgs.
"U.S. Appl. No. 16/557,510, Notice of Allowance mailed Jun. 30, 2022", 8 pgs.
"U.S. Appl. No. 16/557,510, Response filed May 9, 2022 to Final Office Action mailed Mar. 9, 2022", 9 pgs.
"U.S. Appl. No. 16/557,510, Response filed Nov. 22, 2021 to Non Final Office Action mailed Aug. 27, 2021", 9 pgs.
"U.S. Appl. No. 14/751,691, Response filed Jun. 2, 2016 to Non Final Office Action mailed Feb. 2, 2016", 8 pgs.
"European Application Serial No. 10251667.1, Extended Search Report mailed Apr. 18, 2012", 6 pgs.
"European Application Serial No. 10251667.1, Office Action mailed Jan. 16, 2013", 11 pgs.
"European Application Serial No. 10251667.1, Office Action mailed Aug. 1, 2013", 6 pgs.
"European Application Serial No. 10251667.1, Response filed Feb. 10, 2014 to Office Action mailed Aug. 1, 2013", 13 pgs.
"European Application Serial No. 10251667.1, Response filed Jul. 22, 2013 to Office Action mailed Jan. 16, 2013", 8 pgs.
"European Application Serial No. 10251667.1, Response filed Nov. 15, 2012 to Extended Search Report mailed Apr. 18, 2012", 13 pgs.
"European Application Serial No. 10251667.1, Summons to Attend Oral Proceedings mailed Mar. 10, 2014", 4 pgs.

(56) References Cited

OTHER PUBLICATIONS

"European Application Serial No. 16176294.3, Communication Pursuant to Article 94(3) EPC Feb. 6, 2019", 5 pgs.
"European Application Serial No. 16176294.3, Extended European Search Report mailed Nov. 22, 2016", 4 pgs.
"European Application Serial No. 16176294.3, Response filed Jun. 28, 2017 to Extended European Search Report mailed Nov. 22, 2016", 50 pgs.
Enz, Christian C, et al., "Building Blocks for an Ultra Low-Power MEMS-based Radio", Radio-Frequency Integration Technology, IEEE International Workshop, (Dec. 1, 2007), 158-167.
Hyeon, Cheal Kim, et al., "RF MEMS technology", IEEJ Transactions on Electrical and Electronic Engineering vol. 2, No. 3, (Jan. 1, 2007), 249-261.
Lee, S, "Series-Resonant VHF Micromechanical Resonator Reference Oscillators", IEEE Journal of Solid-State Circuits, IEEE Service Center, Piscataway, NJ, USA, vol. 39, No. 12, (Dec. 1, 2004), 2477-2491.
Nguyen, C., "Vibrating RF mems for lower power communications", Materials Research Society Symposium Proceedings, 741, (Dec. 2, 2002), 255-266.
Reffluex, David, et al., "A Narrowband Multi-Channel 2.4GHz MEMS-Based Transceiver", IEEE Journal of Solid-State Circuits, vol. 44, No. 1, (Jan. 1, 2009), 228-239.

* cited by examiner

RADIO FREQUENCY MEMS DEVICES FOR IMPROVED WIRELESS PERFORMANCE FOR HEARING ASSISTANCE DEVICES

CROSS REFERENCE TO RELATED APPLICATIONS

This application is a continuation of U.S. Ser. No. 16/557,510, filed Aug. 30, 2019, which is a continuation of U.S. Ser. No. 15/977,372, filed May 11, 2018, now issued as U.S. Pat. No. 10,405,110, which is a continuation of U.S. Ser. No. 14/751,691, filed Jun. 26, 2015, now issued as U.S. Pat. No. 9,986,347, which is a continuation-in-part under 37 C.F.R. 1.53(b) of U.S. Ser. No. 12/569,567 filed Sep. 29, 2009, which applications are incorporated herein by reference in their entirety.

FIELD OF THE INVENTION

The present subject matter relates generally to hearing assistance devices, including, but not limited to hearing aids, and in particular to radio frequency MEMS devices for improved wireless performance for hearing assistance devices.

BACKGROUND

Modern hearing assistance devices typically include digital electronics to enhance the wearer's experience. In the specific case of hearing aids, current designs employ digital signal processors rich in features. Their functionality is further benefited from communications, either from a remote source or from ear-to-ear for advanced processing. Thus, it is desirable to add wireless functionality to a hearing instrument to allow for functions such as ear-to-ear communications, wireless programming, wireless configuration, data logging, remote control, streaming audio, and bi-directional audio.

Frequencies available for use, such as the ISM frequencies at 900 MHz and 2.4 GHz, offer a large amount of bandwidth and allow sufficient RF power to cover many of the functions shown above. However these ISM frequencies are crowded with relatively high power interferers of various types. The radio in a hearing aid typically is a low power device that can run off of a very small low power battery. The challenge is to build a sensitive receiver with good linearity with minimal voltage and current. The radio and its support components typically are small and occupy as little volume as possible. Typically a radio transceiver in the 900 MHz band will require a frequency stable reference oscillator usually involving a quartz crystal as its resonating element. These devices are relatively large and need mechanical stability and special packaging.

What is needed in the art is a compact system for reliable, low power communications in a hearing assistance device. The system should be useable in environments with radio frequency interference.

SUMMARY

Disclosed herein, among other things, are methods and apparatus for hearing assistance devices, including, but not limited to hearing aids, and in particular to radio frequency MEMS devices for improved wireless performance for hearing assistance devices.

The present subject matter relates to a hearing assistance device configured to be worn by a wearer. The hearing assistance device includes a housing for electronics of the hearing assistance device, including wireless electronics. The wireless electronics include a plurality of radio frequency (RF) MEMS switches, in various embodiments. A hearing assistance processor is adapted to process signals for the wearer of the hearing assistance device. In various embodiments, the hearing assistance device includes an antenna, and a switchable capacitor bank configured for tuning the antenna, the switchable capacitor bank including one or more of the plurality of RF MEMS switches. The plurality of RF MEMS switches includes an electrostatically deformed RF MEMS membrane acting as a variable capacitor, in an embodiment. Different configurations and approaches are provided.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
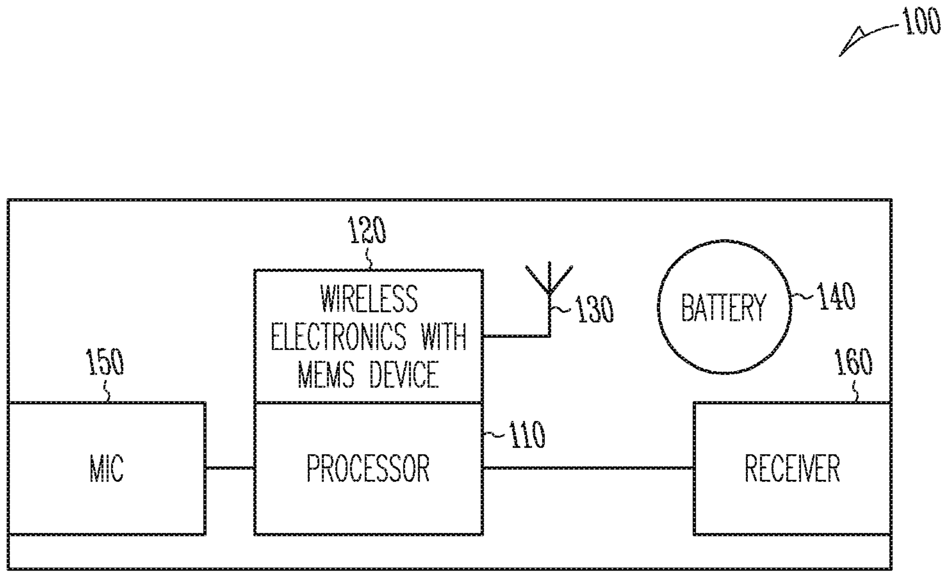
FIG. 1 shows a hearing assistance device including wireless electronics using a MEMS device, according to one embodiment of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates generally to hearing assistance devices, including, but not limited to hearing aids, and in particular to radios using a micro-electro-mechanical system (MEMS) device for hearing assistance device applications.

Radio frequency (RF) transceiver design in hearing assistance devices can be better achieved using RF MEMS technology. RF MEMS devices, such as switches, provide for smaller size components and lower current drain for RF transceivers. Current transceiver integrated circuit (IC) technology involves large external surface acoustic wave (SAW) filters, and higher supply current and power to achieve proper RF receiver selectivity, dynamic range and noise. In some cases, no transmit/receive switches are used which decreases effective antenna efficiency due to losses of the inactive circuitry in parallel with the antenna. Additionally, tunable capacitor banks of metal-insulator-metal (MIM) capacitors utilize on-chip CMOS switches which have significant loss resistance which reduces antenna performance, receiver sensitivity and transmitter RF power output.

The present subject matter provides for RF MEMS switches, tunable RF MEMS capacitors, and tunable RF MEMS resonators. In various embodiments, the RF MEMS devices or resonators are tunable, such that changes the electrostatic coupling tunes the MEMS, rather than relying completely on switching of elements in or out of the circuit. In various embodiments, RF MEMS switches can be used for low loss transmit/receive switches. RF MEMS switches can be used as switches in on-chip capacitor banks, in various embodiments. These improvements provide the benefits of lower loss, higher Q, more transmission power, and increased receiver sensitivity. In addition, RF MEMS switches can be used to implement the multiple filters and resonators for switching in and out the MEMS resonator used in the transceiver below. Additionally, the MEMS resonators, and thus the filters, may be directly tuned by adjusting the electrostatic voltage applied to the resonators. Thus, among other things the present subject matter provides for reduction in losses, lower cost, and higher performance in RF transceiver designs. In various embodiments, the MEMS resonator includes a wine-glass shaped resonator or a disc-shaped resonator. The MEMS resonator can include an aluminum-nitride resonator which is piezoelectric and does not require a static DC bias, and transduction to the MEMS or electrostatic biasing, according to various embodiments. In various embodiments, the RF MEMS resonator includes one or more of an RF pre-selector, RF filter, image filter, IF filter, VCO tank circuit, or part of an impedance matching circuit.

In various embodiments, the present subject matter includes a switchable capacitor bank for antenna tuning, providing substantially lower loss than present on-chip solutions. The present subject matter includes high-Q tuning of VCOs used in UHF frequency synthesizers, in various embodiments. This high-Q tuning via either, or a combination of, RF MEMS variable capacitors, tunable resonators, and switchable tuning elements, provides for improved single-side-band phase-noise performance and frequency band selection. In one embodiment, a variable RF MEMS capacitor includes an electrostatically deformed RF MEMS membrane suspended at the periphery of an antenna of the device. In another embodiment, the deformed RF MEMS membrane is suspended at one end of the antenna for a beam-type device. The present subject matter provides increased performance (RF output, receiver selectivity, and receiver sensitivity) at a lower electrical current, in various embodiments. Various embodiments include a switchable capacitor bank configured for tuning the antenna, such as a (MEMS) switchable capacitor bank. Alternately, or additionally, this may include one or more of the plurality of tunable RF MEMS capacitors. The present subject matter uses MEMS switches to switch a fixed shunt capacitor bank(s), in various embodiments. Various embodiments switch in various RF impedance matching elements, including but not limited to: capacitors, inductors, (MEMS) resonators, or various transmission line lengths. These elements could be switched in series, or shunt, or could even multiplex in individual matching circuit blocks.

FIG. 1 shows a hearing assistance device including wireless electronics using a MEMS device, according to one embodiment of the present subject matter. Hearing assistance device 100 includes a processor 110 and wireless electronics 120 including a micro-electro-mechanical system (MEMS) device. In various embodiments, the MEMS device includes a MEMS filter. In various embodiments, the MEMS device includes a MEMS resonator. Other MEMS devices for the wireless electronics 120 may be used without departing from the scope of the present subject matter. In various embodiments, the processor 110 and wireless electronics 120 are integrated into a single integrated circuit.

The electronics are powered at least in part by battery 140. In various embodiments, the hearing assistance device 100 includes a microphone 150 and a speaker, also known as a receiver, 160. In hearing aid applications, the processor is adapted to receive sound signals from the microphone 150 and processed to provide adjustable gain to offset hearing loss of the wearer of the hearing aid. In various embodiments, signals received by the wireless electronics 120 can be processed if desired, including the ability for the wireless transceiver of the hearing assistance device to receive or transmit digitized, encoded audio streams, commands and statuses.

In hearing aid applications, in various embodiments the processor 110 includes a digital signal processor in communication with the wireless electronics 120 to perform communications. In various embodiments, the processor and wireless electronics are adapted to perform communications as set forth herein.

Figure 2:
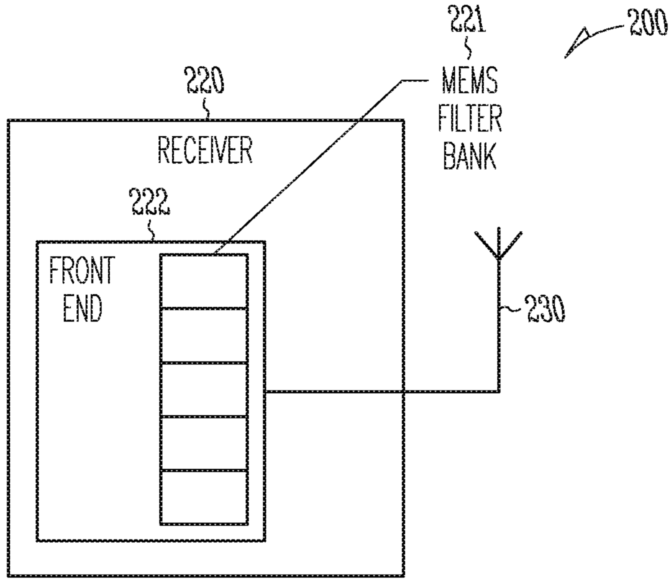
FIG. 2 shows a block diagram of a system including a receiver and an antenna, according to one embodiment of the present subject matter.

FIG. 2 shows a block diagram of a system 200 including a receiver 220 and an antenna 230, according to one embodiment of the present subject matter. The front end of the receiver 222 includes a filter bank 221 including one or more MEMS devices. In various embodiments, the filter bank 221 includes a plurality of MEMS filters. In various embodiments, the front end filter bank serves as a front end preselector filter for one or more radio frequency channels of interest. Such embodiments have an advantage in that they mitigate interference in the ISM band. In various embodiments a channel bank of MEMS filters is used in a receiver front end. Such embodiments address the limited linearity of low noise amplifiers and mixers in low power radio designs. Overload due to out of band signals is limited and further filtering may not be necessary. Phase noise requirements of the local oscillator are relaxed due to the absence of reciprocal mixing of out of band signals. Image rejection is achieved through the use of these front end MEMS filters and/or MEMS filters after a low-noise amplifier (LNA). Since the phase noise requirements are significantly reduced, the local oscillator may be realized using a MEMS resonator with less stringent phase noise requirements. Alternately, MEMS resonators with very high-Q may have extremely good phase-noise requirements, depending on the Q of the resonator. In various embodiments, the MEMS resonators are fabricated on the same process as the fabrication of a silicon radio. Such a bank of preselector filters uses MEMS resonators tuned to the proper frequency of operation. This approach allows high integration of the resonating MEMS devices. In various embodiments, one or more of the switches shown in FIG. 2 can be MEMS switches.

Figure 3:
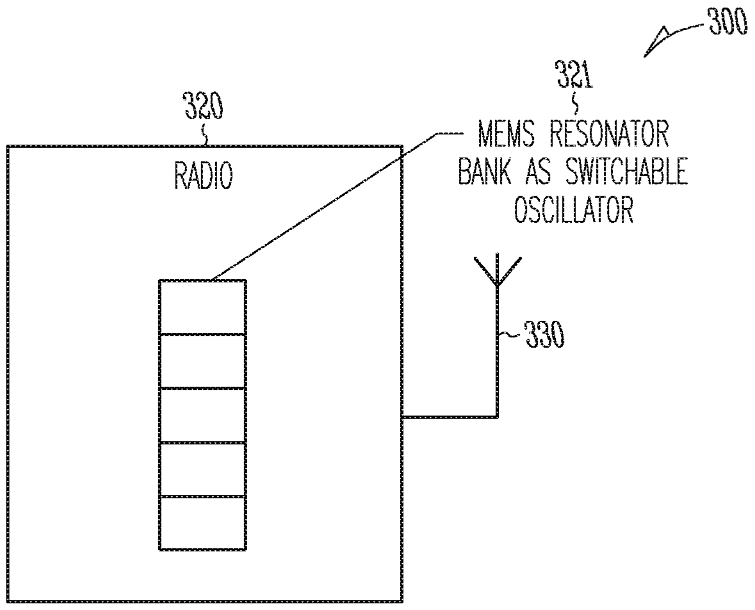
FIG. 3 shows a block diagram of a system including a radio and an antenna, according to one embodiment of the present subject matter.

FIG. 3 shows a block diagram of a system 300 including a radio 320 and an antenna 330, according to one embodiment of the present subject matter. The radio 420 can be a receiver, a transmitter, or a transceiver for radio communications. In various embodiments a bank of MEMS resonators is used to create multiple local oscillator frequencies by switching resonators to channel select the frequency of interest. In various embodiments, a bank of silicon resonators for a MEMS type oscillator circuit can be switched and provide the local oscillator frequency necessary for modulation and demodulation of an RF signal.

Figure 4:
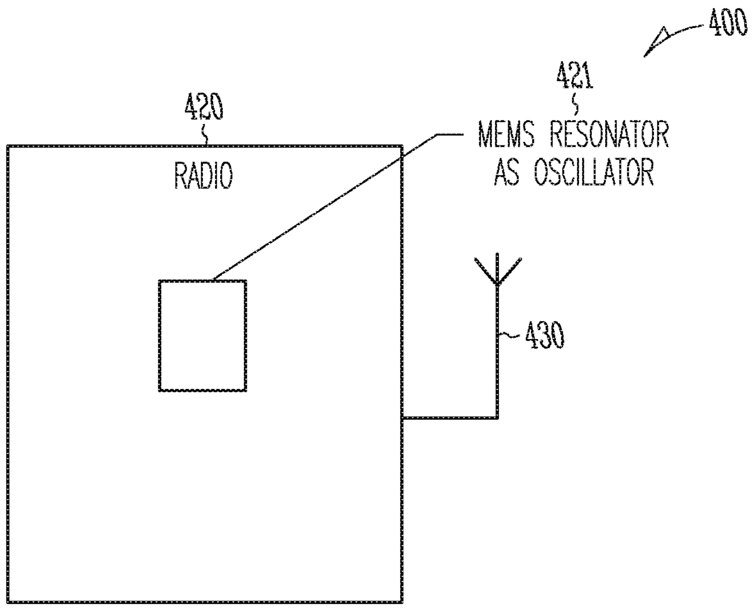
FIG. 4 shows a block diagram of a system including a radio and an antenna, according to one embodiment of the present subject matter.

FIG. 4 shows a block diagram of a system 400 including a radio 420 and an antenna 430, according to one embodiment of the present subject matter. The radio 420 can be a receiver, a transmitter, or a transceiver for radio communications. In various embodiments a MEMS resonator 421 is used to create an oscillator. In various applications the oscillator is a local oscillator for mixing. In various applications the oscillator is used for superheterodyne functions. This oscillator may use the individual switching of multiple resonators, or capacitors, which can tune the resonating element to change oscillator frequency. In various embodiments, a single reference oscillator consisting of a single MEMS device as its resonator is fabricated and used as the reference oscillator for a synthesizer including, but not limited to, a voltage controlled oscillator (VCO) and a phase locked loop (PLL).

Other communications electronics and communications functions can be realized using the MEMS device in the wireless electronics without departing from the scope of the present subject matter. The examples given herein are intended to be demonstrative and not exhaustive or exclusive.

Figure 5:
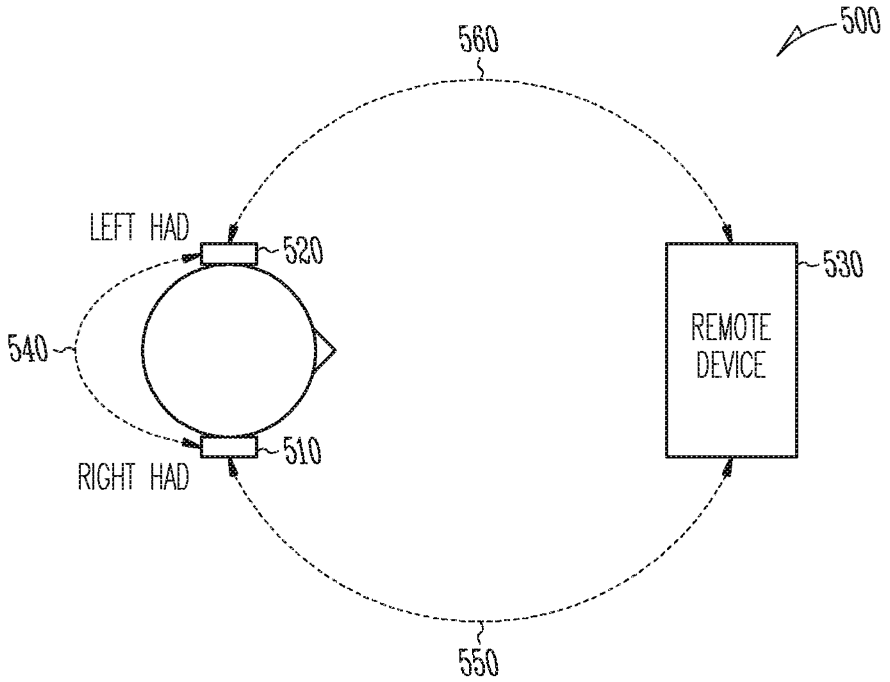
FIG. 5 shows a plurality of different communications that can be supported, according to various embodiments of the present subject matter.

FIG. 5 shows a plurality of different communications that can be supported, according to various embodiments of the present subject matter. System 500 demonstrates that such communications include ear-to-ear communications 540 or ear-to-remote-device communications 550 or 560 with remote device 530. It is understood that these communications can be unidirectional, bidirectional, or combinations of both. Such communications can also include far field communications (e.g., radio frequency communications), or combinations of near field (e.g., inductive link using substantially the magnetic field) and far field communications. It is understood that remote device 530 can be any wireless devices, including, but not limited to a wireless audio controller such as that described in U.S. Patent Application Publication 2006/0274747, entitled: COMMUNICATION SYSTEM FOR WIRELESS AUDIO DEVICES, and PCT Application Publication WO 2006/133158, titled: COMMUNICATION SYSTEM FOR WIRELESS AUDIO DEVICES, which are both hereby incorporated by reference in their entirety.

In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection between devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. Such connections include all past and present link protocols. It is also contemplated that future versions of these protocols and new future standards may be employed without departing from the scope of the present subject matter.

In various embodiments a protocol is used, such as the protocol described in U.S. Patent Application Publication 2006/0274747, entitled: COMMUNICATION SYSTEM FOR WIRELESS DEVICES, and PCT Application Publication WO 2006/133158, tided: COMMUNICATION SYSTEM FOR WIRELESS AUDIO DEVICES, which are both hereby incorporated by reference in their entirety. In various embodiments, a protocol is used such as the protocol in U.S. Pat. No. 7,529,565, which is hereby incorporated by reference in its entirety. Other protocols may be used without departing from the scope of the present subject matter.

Figure 6:
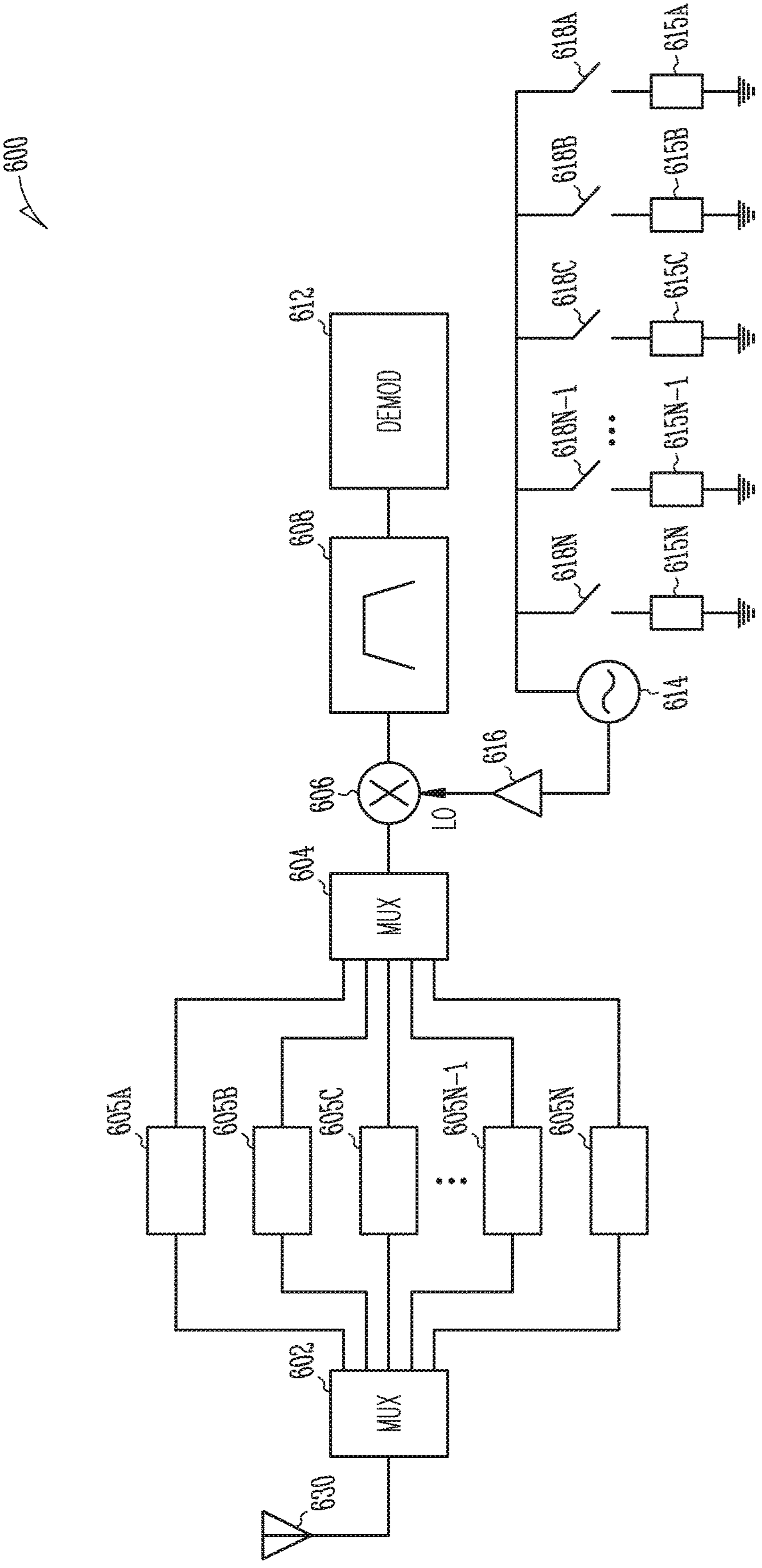
FIG. 6 shows an example of a receiver using MEMS components, according to one embodiment of the present subject matter.

FIG. 6 shows an example of a receiver using MEMS components, according to one embodiment of the present subject matter. Receiver 600 includes an antenna 630 which provides a signal to the receiver 600. The signal is multiplexed by multiplexer 602 to a bank of selectable filters 605A-N, which are MEMS filters in one embodiment. The selectable filters 605A-N provide inputs to a multiplexer 604 which provides a selected RF signal to mixer 606 based on the filter selection. The selected RF signal is mixed with an oscillator frequency that is selectably produced by a series of selectable resonators 615A-N, switches 618A-N, and oscillator 614 that is sent to the mixer 606 via amplifier 616. In one embodiment, the resonators 615A-N are MEMS resonators. The mixing by mixer 606 provides a resulting intermediate frequency that is passed through bandpass filter 608 and demodulated using demodulator 612. Other variations of components and signal processing using one or more MEMS devices are possible without departing from the scope of the present subject matter. It is understood that such designs may be implemented in hearing assistance devices, including, but not limited to hearing aids. In various embodiments, one or more of the switches shown in FIG. 6 can be MEMS switches.

Figure 7:
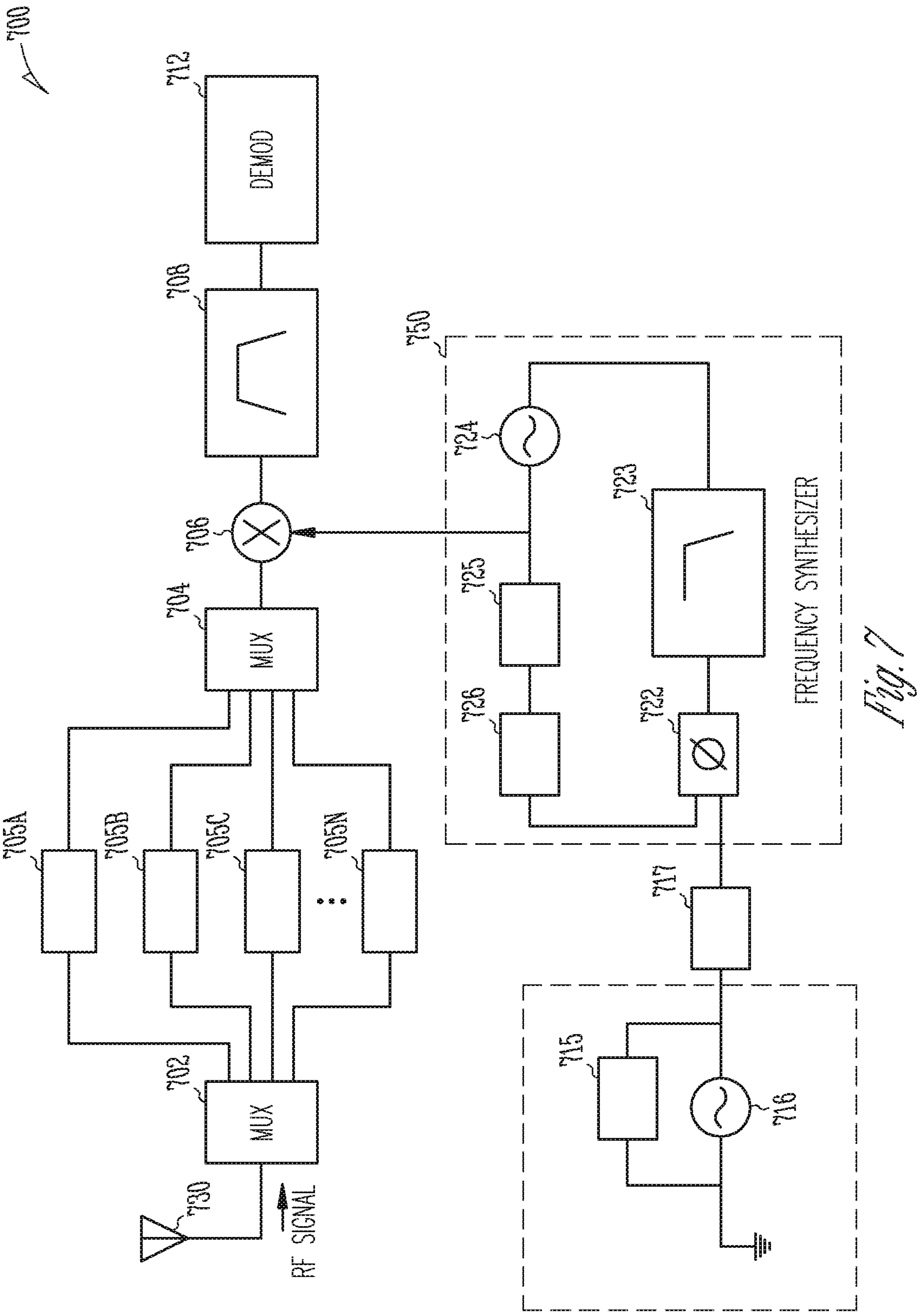
FIG. 7 shows an example of a receiver using MEMS components, according to one embodiment of the present subject matter.

FIG. 7 shows an example of a receiver using MEMS components, according to one embodiment of the present subject matter. Receiver 700 includes an antenna 730 which provides a signal to the receiver 700. The signal is multiplexed by multiplexer 702 to a bank of selectable filters 705A-N, which are MEMS filters in one embodiment. The selectable filters 705A-N provide inputs to a multiplexer 704 which provides a selected RF signal to mixer 706 based on the filter selection. The selected RF signal is mixed with an oscillator frequency that is produced by a resonator 715 and oscillator 716 that is sent to a divider 717. In one embodiment, the resonator is a MEMS resonator. The output of divider 717 is provided to a frequency synthesizer 750. The output goes to the phase detector 722 which compares the phase with a signal from voltage controlled oscillator 724 in series with a loop filter 723. The output of phase detector 722 is provided to a counter 726 and a divider 725 that is in a loop configuration with the voltage controlled oscillator 724, loop filter 723 and phase detector 722. The output of the frequency synthesizer is provided to mixer 706. The mixing by mixer 706 provides a resulting intermediate frequency that is passed through bandpass filter 708 and demodulated using demodulator 712. Other variations of components and signal processing using one or more MEMS devices are possible without departing from the scope of the present subject matter. It is understood that such designs may be implemented in hearing assistance devices, including, but not limited to hearing aids. In various embodiments, one or more of the switches shown in FIG. 7 can be MEMS switches.

It is understood that variations in communications protocols, antenna configurations, and combinations of components may be employed without departing from the scope of the present subject matter. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

The present subject matter can be used for a variety of hearing assistance devices, including but not limited to, cochlear implant type hearing devices, hearing aids, such as behind-the-ear (BTE), in-the-ear (ITE), in-the-canal (ITC), invisible-in-canal (IIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. Such devices are also known as receiver-in-the-canal (RIC) or receiver-in-the-ear (RITE) hearing instruments. It is understood that other hearing assistance devices not expressly stated herein may fall within the scope of the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing assistance device configured to be worn by a wearer, comprising:

a housing;

a microphone within the housing;

a hearing assistance processor within the housing configured to process signals received by the microphone for the wearer of the hearing assistance device; and wireless electronics within the housing, the wireless electronics configured to connect to an antenna and including a radio frequency (RF) synthesizer having one or more micro-electro-mechanical system (MEMS) resonators configured as at least a portion of a reference oscillator for the RF synthesizer.

2. The hearing assistance device of claim 1, wherein the wireless electronics include a receiver or a transmitter.

3. The hearing assistance device of claim 1, wherein the wireless electronics include a transceiver.

4. The hearing assistance device of claim 1, wherein the RF synthesizer includes a voltage controlled oscillator (VCO).

5. The hearing assistance device of claim 1, wherein the RF synthesizer includes a phase locked loop (PLL).

6. The hearing assistance device of claim 1, wherein the reference oscillator includes a local oscillator configured for mixing signals.

7. The hearing assistance device of claim 1, wherein the reference oscillator is configured for superheterodyne functions.

8. The hearing assistance device of claim 1, wherein the reference oscillator is configured for individual switching of multiple capacitors for tuning at least one of the one or more MEMS resonators.

9. The hearing assistance device of claim 1, wherein the hearing assistance device includes a hearing aid.

10. The hearing assistance device of claim 9, wherein the hearing aid includes an in-the-canal (ITC) hearing aid, a receiver-in-canal (RIC) hearing aid, a completely-in-the-canal (CIC) hearing aid, an invisible-in-canal (ITC) hearing aid, or a receiver-in-the-ear (RITE) hearing aid.

11. The hearing assistance device of claim 1, wherein the one or more MEMS resonators include a piezoelectric resonator.

12. The hearing assistance device of claim 1, wherein the one or more MEMS resonators include an aluminum-nitride resonator.

13. The hearing assistance device of claim 1, wherein the one or more MEMS resonators include a disc shaped resonator.

14. The hearing assistance device of claim 1, wherein the one or more MEMS resonators include a wine-glass shaped resonator.

15. The hearing assistance device of claim 1, wherein the one or more MEMS resonators include a portion of an RF pre-selector.

16. The hearing assistance device of claim 1, wherein the one or more MEMS resonators include a portion of an RF filter.

17. The hearing assistance device of claim 1, wherein the one or more MEMS resonators include a portion of an image filter.

18. The hearing assistance device of claim 1, wherein the one or more MEMS resonators include a portion of a VCO tank circuit.

19. The hearing assistance device of claim 1, wherein the one or more MEMS resonators include a portion of an IF filter.

* * * * *